(12) United States Patent
Fulkerson

(10) Patent No.: US 9,418,344 B2
(45) Date of Patent: Aug. 16, 2016

(54) IN-STORE COMMUNICATION, SERVICE AND DATA COLLECTION SYSTEM

(75) Inventor: Thomas M. Fulkerson, Wimberly, TX (US)

(73) Assignee: LABEANRU LLC, Houston, TX (US)

( * ) Notice: Subject to any disclaimer, the term of this patent is extended or adjusted under 35 U.S.C. 154(b) by 768 days.

(21) Appl. No.: 13/529,353

(22) Filed: Jun. 21, 2012

(65) Prior Publication Data

US 2013/0006789 A1    Jan. 3, 2013

Related U.S. Application Data

(60) Provisional application No. 61/505,850, filed on Jul. 8, 2011, provisional application No. 61/502,080, filed on Jun. 28, 2011.

(51) Int. Cl.
*G06Q 30/06* (2012.01)
*G06Q 10/00* (2012.01)
*G06Q 30/08* (2012.01)

(52) U.S. Cl.
CPC ...................................... *G06Q 10/00* (2013.01)

(58) Field of Classification Search
CPC .............................. G06Q 30/06; G06Q 30/08
USPC .............................................. 705/26.1, 27.1
See application file for complete search history.

(56) References Cited

U.S. PATENT DOCUMENTS 6,389,400 B1    5/2002  Bushey
6,587,835 B1 *  7/2003  Treyz et al. ................. 705/14.64
(Continued)

OTHER PUBLICATIONS

Fornell, Claes et al, "Customer Satisfaction and Stock Prices: High Returns, Low Risk," Journal of Marketing, vol. 70, p. 3-14 (2006).
(Continued)

*Primary Examiner* — James Zurita
(74) *Attorney, Agent, or Firm* — Remenick PLLC

(57) ABSTRACT

An apparatus and method to improve the handling of in-store customer requests for assistance, generate feedback and use data generated by customer requests for assistance. A customer input device, such as a placard, hand-held or cart carried mobile device, enables customers to request assistance and immediately and easily grade the assistance they receive. In one embodiment, the communication from such customer input device is automatically routed to individual(s) having responsibility for the department from which the customer's request for assistance has emanated. In other aspects, the response times, self expressed customer satisfaction scores and subsequent sales results are compiled and collated to improve customer service, and enable management to develop an appropriate reward or sanction system for sales employees. In still another embodiment, the customer request is associated with a musical chime or other identifying information that assists the customer representative in identifying the location of the customer.

22 Claims, 6 Drawing Sheets

(56) References Cited

U.S. PATENT DOCUMENTS

| | | |
|---|---|---|
| 7,065,494 B1 | 6/2006 | Evans |
| 7,406,437 B2 | 7/2008 | Goodwin, III, et al |
| 7,558,834 B2 | 7/2009 | Embree |
| 7,693,839 B2 | 4/2010 | Daniels, Jr. et al. |
| 8,249,225 B2 * | 8/2012 | Jaiswal et al. ............. 379/88.02 |
| 2001/0014868 A1 | 8/2001 | Herz et al. |
| 2003/0132298 A1 * | 7/2003 | Swartz ................... G06K 17/00 235/472.02 |
| 2004/0172323 A1 | 9/2004 | Stamm |
| 2005/0007965 A1 | 1/2005 | Hagen |
| 2007/0138268 A1 | 6/2007 | Tuchman |
| 2008/0183579 A1 | 7/2008 | Avner |
| 2010/0257013 A1 | 10/2010 | Beauregard |

OTHER PUBLICATIONS

PCT Search Report and Patentability Report for PCT/US2012/043494, dated Sep. 13, 2012.

* cited by examiner

IN-STORE COMMUNICATION, SERVICE AND DATA COLLECTION SYSTEM

REFERENCE TO RELATED APPLICATIONS

This application claims priority to U.S. Provisional Application No. 61/502,080 filed Jun. 28, 2011 and entitled "In-Store Communication, Service and Data Collection System" and U.S. Provisional Application No. 61/505,850 filed Jul. 8, 2011 and entitled "In-Store Communication, Service and Data Collection System," both of which are incorporated in their entirety herein.

BACKGROUND OF THE INVENTION

1. Field of the Invention

This invention relates to the field of retail sales, and more particularly to the field of providing customer communication and data collection services.

2. Introduction

Modern retail establishments employ personnel to assist customers in locating goods and in making buying and selection decisions. The need for economies of scale and competitive forces have caused many modern retail establishments to become relatively large and the selection of goods within such establishments are extensive. Sales representatives are often required to patrol relatively large areas of the retail establishment and may need to leave their assigned departments. In addition, other personnel within retail establishments, such as shelvers or customer "help desk" personnel may have knowledge about product location and specifications but no means of knowing whether a customer needs assistance or of communicating answers.

In addition, the competitive drive to reduce costs causes retailers to reduce staffing rates to the minimum feasible number of sales assistants or others (such as product stackers) who might be capable of rendering assistance. As a result, customers are frequently frustrated in their efforts to obtain assistance in product location, product description and other information, resulting in low ratings of in-store customer service by retail buyers. The result for many retailers has been customer satisfaction ratings among the lowest of any group providing service. These results are particularly damaging to most retail establishments as customer satisfaction is demonstrably and consistently connected to growth in organization value and return to investors. Fornell, Claes et al. (2006), "Customer Satisfaction and Stock Prices: High Returns, Low Risk," *Journal of Marketing*, Vol. 70, 3-14.

In the current art, sales representatives are equipped with loudspeaker systems and either mobile or stationary employee to employee communication systems. Customers generate requests for help manually by seeking out customer service representatives. If an employee from one department happens to be tapped for assistance when near a second department, he or she usually forwards the request to the employee in charge of the operative department. Loudspeakers permit certain designated sales staff to broadcast requests for assistance by customers at specific locations within the store. Employee to employee communication systems are an improvement over loudspeaker systems in that they permit an employee to identify and to request help by an employee most knowledgeable of a customer's inquiry. Nonetheless, loudspeaker and employee-to-employee communication systems suffer from a number of limitations. Loudspeaker systems interrupt the activities of other customers and staff. In addition, because of background noise and other effects, loudspeaker systems may not reach the in store personnel whom they seek. Because the customer's request process is based solely on physical proximity, it often results in the customer selecting an employee that, though available, lacks information about the product sought.

Employee to employee communication systems are an improvement over loudspeaker systems, but also suffer from a number of limitations Like loudspeaker systems, employee to employee in-store communication systems require that the customer locate and initiate their request to store personnel who may not be assigned to the department in which they seek assistance. In addition, once the call for assistance has been forwarded, such systems provide no mechanism for assuring that the customer has been served or for measuring how well the customer has been served. Finally, no mechanism exists within such a system to track whether the customer assistance resulted in a sale or the size of that sale.

The system disclosed by Daniels et al. (U.S. Pat. No. 7,693,839) represents an improvement over these traditional systems in that it provides a means for customers to use a placard type system to activate a telephone and request help, but this system also suffers from a number of deficits. First, the system fails to take advantage of the availability of modern local area networks (LANs) to broadcast requests to specified persons within a store-only communication system. Second, it fails to enable requests for help to "roll over" to ancillary help sources when the primary sales agent is unavailable. Third, such a system does not provide any method for customers to rate the assistance they have received or to track important information such as the interval between request and response or the ultimate response by the customer to the sales assistance he or she has received. Fourth, the system is subject to abuse by children or others with malicious intent who may flood the system with spurious data. Finally, other than repeating a periodic request for help, the system does not ensure that the customer is ever served.

Several systems, such as those disclosed by Goodwin (U.S. Pat. No. 7,406,437) and by Herz et al. (U.S. Patent Application No. 2001/0014868), disclose either apparatus or methods of enhancing a customer's ability to understand the location of products, providing lists of products by task, or providing promotional data or store mapping systems with graphic displays. In such systems the customer either has or is provided a mobile device that the customer uses to input his or her intended purchases and in turn produces a map of the store and the location of his or her intended purchases. These systems are also an improvement over traditional manual interaction, loudspeaker or employee to employee communication techniques, but they suffer from significant deficiencies which the proposed apparatus and methods correct. All such systems focus on enhancing customer satisfaction and increasing staff efficiency by eliminating customer to employee interaction. As a result, such systems have a number of limitations. First, such systems presume that customers know from the moment they enter a store precisely what they intend to buy, when in fact many customers attend a store to obtain information and expertise that will influence their purchase decision. Second they assume that customers have their own mobile transmitting devices or are sufficiently savvy to be comfortable handling such devices. Third, such systems either require the provision of costly personal aid devices by the retailer (with subsequent risk of theft or inadvertent diversion) or require a decision by the customer to "identify himself" by swiping an identifying magnetic strip such as a drivers license or unique mobile telephone radio signal, which the customer may find objectionable on privacy grounds. Fourth, by encouraging customers to bypass human customer service, the retailer misses potential sales opportunity that only human helpers can initiate.

Finally, because no direct customer to sales representative system is currently expressed in the prior art, none of the prior art discusses the use of musical tones or other identifying information to enable sales staff to immediately identify precise customer location prior to a response to a request for help. The proposed system relies upon ordinary human memory, retention and processing skills to learn and automatically correlate unique tones or identifying data with repetitive requests for assistance to immediately recognize customer location and initiate the thought process regarding goods in that area. Such tone or position recognition words will substantially expedite and improve customer service.

In addition, all existing systems suffer from a number of disadvantages from the perspective of the retailer. None allow customer feedback to be easily directed to the personnel who have assisted customers, thus diminishing the retailer's ability to make hiring, firing and reward (bonus, advancement) decisions. Unless customers are unusually happy or unhappy with the outcomes of in-store interactions, they are unlikely to make their thoughts known. Structured in-store requests by store owners for feedback by their customers receive notoriously low response rates by customers such that the responses may not be statistically valid or representative.

Finally, even in-store system designed to forward customer requests to department heads, the system itself is not "trained" to track the interactions between specific personnel and resulting sales or to compile them so that the employer can make a valid judgment on the effectiveness or ineffectiveness of in-store sales personnel, or at even a higher level of data accumulation, the effectiveness of managers whose job it is to train and motivate sales staff. If a customer is ill served, the fault may be with the initial recipient of the request, or the ultimate recipient. The lack of more than ad hoc information on the number of customers frequenting a specific department, the frequency of their requests for information and their complexity make it difficult for retail store managers to segregate their assignments of sales personnel to departments in which they work well, to counsel employees or to reward or sanction employees based upon above or below average performance.

A need therefore exists for a system and method that enables: (1) customers to direct their requests quickly and automatically to staff most knowledgeable about the products they seek; (2) store owners to re-direct requests to "ancillary" personnel that management feels are the next most capable of responding when the primary sales assistant is unavailable (3) sales staff to immediately recognize the location of the customer who has initiated the request; (4) customers to express the degree of their satisfaction or dissatisfaction with sales efforts; and (5) employers to filter, collect, evaluate and utilize customer satisfaction and sales data attributable to employees to enhance performance and the retention of effective employees.

SUMMARY

The present invention overcomes the problems and disadvantages associated with current strategies and designs and provides new systems and methods of customer service and data collection.

One embodiment of the invention is directed to an in-store communication and data collection system. The system comprises at least one customer interface unit, a central processing unit in communication with the at least one customer interface unit, a plurality of customer representative units in communication with the central processing unit, and software executing on the central processing unit. The software receives a request for assistance from the at least one customer interface unit, determines the location of the request for assistance, determines, based on the location of the request for assistance, a first designated customer representative, routes the request for assistance to the customer representative unit of the first designated customer representative, reroutes the request for assistance to the customer representative unit of an additional designated customer representative(s) if the first designated customer representative is unavailable, and obtains and records customer feedback from the customer interface unit.

In a preferred embodiment, identifying information of the designated customer representative is displayed on the at least one customer interface unit. Preferably, the customer feedback is collected for each designated customer representative, analyzed, and output as at least one report after being filtered for spurious customer response. The customer feedback is preferably collected one of on a periodic basis and continuously. In the preferred embodiment, the customer feedback is collected for all employees utilizing the system and compared by standard statistical analysis. The customer feedback is preferably compared to in-store sales data.

In the preferred embodiment, the software tracks sales that are attributable to each designated customer representative. The in-store sales data is preferably systematically adjusted for the period in which sales occurring after the designated customer representative's shift are attributable to that designated customer representative. The software preferably detects false positive customer feedback, by at least one of requiring the recordation of a customer service request before recording a customer feedback, and limiting the interval between the customer service request and customer service feedback to a predetermined interval.

Preferably, the software further produces discrete audible or visual signal at the customer representative unit for the designated customer representative, wherein the discrete audible or visual signal identifies the location within the store of the request for assistance. In the preferred embodiment, the at least one customer interface unit is one of an in-store placard, a personal mobile device, an on-cart device, and store-provided mobile device. Preferably, the location of the customer service request is determined based on at least one of position of a placard, RFID transponders, ultrasonic identifiers, radar devices, bluetooth devices, and GPS.

Another embodiment of the invention is directed to a method of in-store communication and data collection, comprising at least one computer. The method comprises receiving a request for assistance from at least one customer interface unit, determining the location of the request for assistance, determining, based on the location of the request for assistance, a first designated customer representative, routing the request for assistance to a customer representative unit of the first designated customer representative, rerouting the request for assistance to a customer representative unit of an additional designated customer representative if the first designated customer representative is unavailable, and obtaining and recording customer feedback from the customer interface unit.

In the preferred embodiment, the method further comprises displaying identifying information of a designated customer representative on the customer interface unit. Preferably, the customer feedback is collected for each designated customer representative, analyzed, and output as at least one report. The customer feedback is preferably collected one of on a periodic basis and continuously. The customer feedback preferably is collected for all employees and compared using standard statistical analysis. In the preferred embodiment, the method further comprises comparing the customer feedback to in-store sales data.

Preferably, the method of further comprises determining the in-store sales that are attributable to each designated customer representative. The in-store sales data is preferably systematically adjusted for a period in which sales occurring after the designated customer representative's shift are attributable to that designated customer representative. The method preferably further comprises detecting false positive customer feedback, by at least one of requiring the recordation of a customer service request before recording a customer feedback, limiting the interval between the customer service request and customer service feedback to a predetermined interval, and ignoring rapid repeated comments upon service within a defined interval.

In a preferred embodiment, the method further comprises producing discrete audible or visual signals at the customer representative unit for the designated customer representative, wherein the discrete audible or visual signal identifies the location within the store of the request for assistance. The at least one customer interface unit is preferably one of an in-store placard, a personal mobile device, an on-cart device, and store-provided mobile device. Preferably, the location of the customer service request is determined based on at least one of position of a placard, RFID transponders, ultrasonic identifiers, radar devices, bluetooth devices, and GPS.

Another embodiment of the invention is directed to a computer readable media for in-store communication and data collection. The media directs at least one computer to receive a request for assistance from at least one customer interface unit, determine the location of the request for assistance, determine, based on the location of the request for assistance, a first designated customer representative, route the request for assistance to a customer representative unit of the first designated customer representative, reroute the request for assistance to a customer representative unit of an additional designated customer representative if the first designated customer representative is unavailable, and obtain and record customer feedback from the customer interface unit.

In the preferred embodiment the computer readable media, further directs at least one computer to display identifying information of a designated customer representative on the customer interface unit. Preferably, the customer feedback is collected for each designated customer representative, analyzed, and output as at least one report. The customer feedback is preferably collected one of on a periodic basis and continuously. The customer feedback preferably is collected for all employees and compared using standard statistical analysis.

Preferably, the computer readable media further directs at least one computer to compare the customer feedback to in-store sales data. The computer readable media preferably further directs at least one computer to determine the in-store sales that are attributable to each designated customer representative. Preferably, the in-store sales data is systematically adjusted for a period in which sales occurring after the designated customer representative's shift are attributable to that designated customer representative.

Preferably, the computer readable media further directs at least one computer to detect false positive customer feedback, by at least one of requiring the recordation of a customer service request before recording a customer feedback, and limiting the interval between the customer service request and customer service feedback to a predetermined interval. The computer readable media preferably further directs at least one computer to produce discrete audible or visual signals at the customer representative unit for the designated customer representative, wherein the discrete audible or visual signals identify the location within the store of the request for assistance.

Preferably, the at least one customer interface unit is one of an in-store placard, a personal mobile device, an on-cart device, and store-provided mobile device. The location of the customer service request is preferably determined based on at least one of position of a placard, RFID transponders, ultrasonic identifiers, radar devices, bluetooth devices, and GPS.

Other embodiments and advantages of the invention are set forth in part in the description, which follows, and in part, may be obvious from this description, or may be learned from the practice of the invention.

BRIEF DESCRIPTION OF THE DRAWINGS

The invention is described in greater detail by way of example only and with reference to the attached drawings, in which.

DETAILED DESCRIPTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

Figure 1:
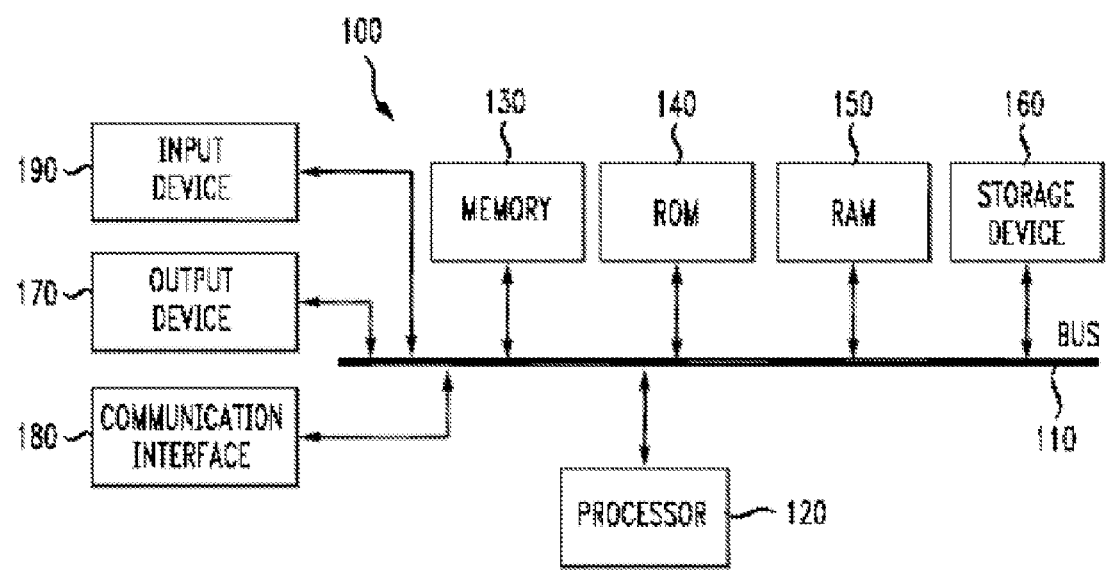
FIG. 1 illustrates an embodiment of the system of the invention.

With reference to FIG. 1, an exemplary system includes at least one general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive, a solid state memory drive, or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, a computer server, or a wireless devices, including wireless Personal Digital Assistants ("PDAs") (e.g., Palm™ VII, Research in Motion's Blackberry™, Apple's iPhone™, or Google's Android™), wireless web-enabled phones, other wireless phones, etc.

Although the exemplary environment described herein employs a hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input and so forth. The device output 170 can be one or more of a number of output mechanisms known to those of skill in the art, for example, printers, monitors, projectors, speakers, and plotters. In some embodiments, the output can be via a network interface, for example uploading to a website, emailing, attached to or placed within other electronic files, and sending an SMS or MMS message. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Networks may include the Internet, one or more Local Area Networks ("LANs"), one or more Metropolitan Area Networks ("MANs"), one or more Wide Area Networks ("WANs"), one or more Intranets, etc. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Figure 2:
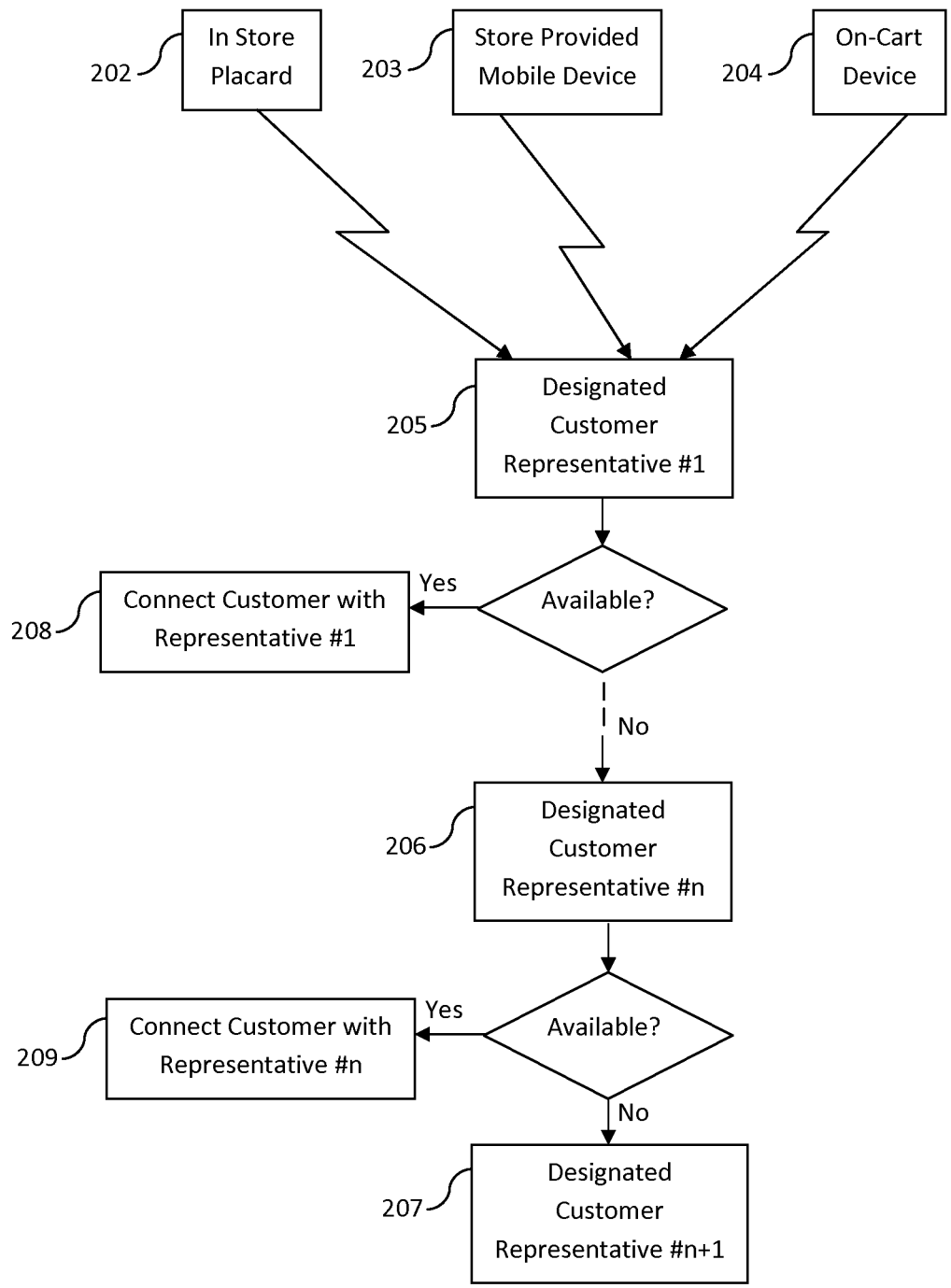
FIG. 2 illustrates a flowchart of an embodiment of the method of the invention.

FIG. 2 represents a typical embodiment of the invention in which contact is preferably initiated either by an in-store placard 202 (e.g. a stationary computer, touch screen, or other communication device), a store-provided portable communication device 203, the customer's personal mobile device, a communication device attached to a cart 204, or other device capable of sending and receiving messages. Preferably, customers initiate a request for assistance by a clearly marked prompting inquiry contained on the device (202-204). For example, the customer may press a call button on placard 202 or click a link or icon on mobile device 203. The system will preferably connect the customer directly with a preferred customer representative 208. The system is preferably programmed, in the event of a pre-set passage of time, established by the retailer (e.g. 10 second, 20 seconds, 30 seconds, or one minute), to divert the request to a second designated customer representative 206 in the event the first designated customer representative cannot or does not respond to the call. If the second designated customer representative is available, the system preferably connects the customer with the second designated customer representative 209. The system preferably continues to attempt to connect the customer to an additional designated customer representative 207 until an available designated customer representative is found. Furthermore, the system can be programmed to divert the request off-site (e.g. to a corporation's headquarters, another store, a call-center, or another location) either after a speicifc number of attempts to reach an in-store customer representative or for specific types of requests. In one embodiment, the system is programmable, at the request of the store owner, so that the store owner sets the interval of response for the initial designated customer representative and the identity of each alternative designated customer representative.

Figure 3:
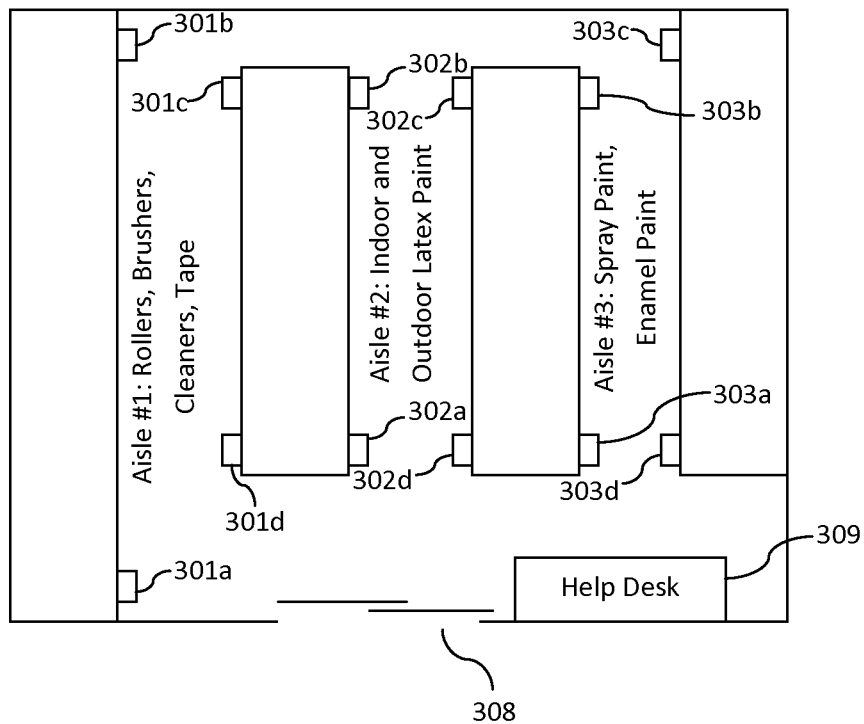
FIGS. 3 and 4 illustrate sample floor layouts of an exemplary store.

FIG. 3 represents a common potential use and layout of the invention. At an entry 308 point preferably a customer help desk or kiosk 309 either provides to the customer the device necessary to contact store personnel, the cart bearing the communicator, or permits the customer to identify him or herself to the store-based communication system by providing unique identifying information from the customer's mobile communication device. In the preferred embodiment, an in-store local area network receives the data and records it, identifying the customer for the duration of his or her stay in the store.

In most modern retail establishment, products are differentiated by type. For the purposes of illustration only, but without limiting the invention, we use the example of aisles carrying paint and related products in a large scale "do it yourself" home repair supply store. In one embodiment, placards 301a-303d are placed at strategic points within the aisles and at positions facilitating easy customer access. The decision concerning the number of placards and their placement are within the determination of the store owner.

Figure 4:
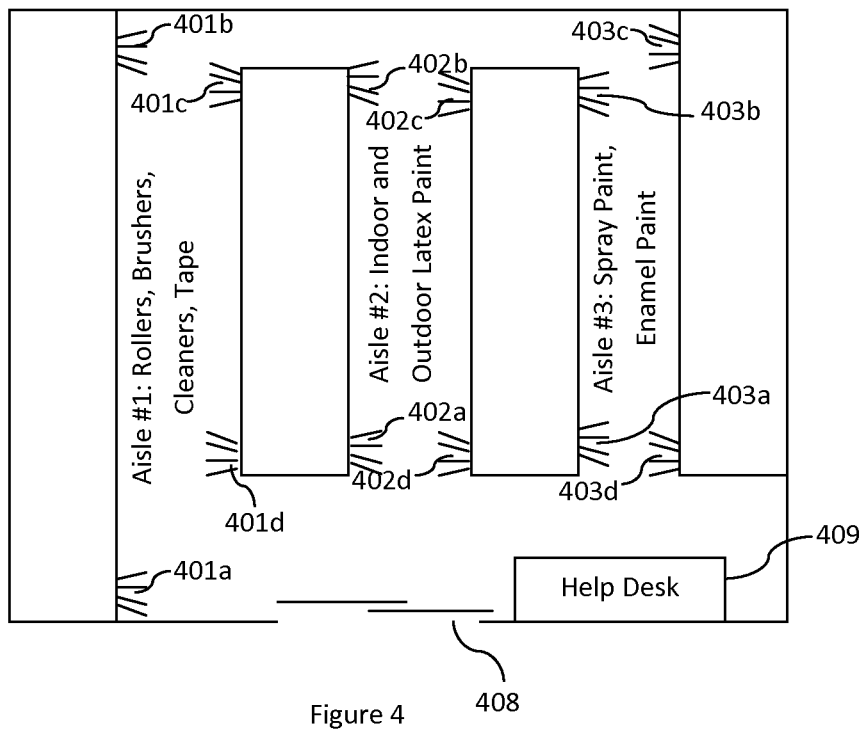

An alternative embodiment is set forth in FIG. 4. In the embodiment utilizing store providing mobile devices, cart-borne devices, or in which the customer uses his own mobile device, receptors 401a-403d are placed in such a manner as to optimally detect the location of the customer at the time the customer stops to initiate an inquiry. Receptors 401a-403d can be RFID transponders, ultrasonic identifiers, radar devices, bluetooth devices, or other triangulation devices. However, in embodiments where a customer's personal mobile device is used, GPS positioning or cellular tower triangulation can be used to determine the customer's location.

In one embodiment, the customer call is received by the designated customer representative with no precursor. The customer representative unit may be a two way radio, a PDA, a mobile phone, a smartphone, a tablet computer, or another communications device. In another embodiment of the invention, the customer call is received by the designated customer representative with an identifying phrase, sound, or musical tone. Preferably, for each help station represented by a placard or receiver/transmitter, a request for assistance generates a unique tone or phrase. No particular set of identifying phrases, sounds, or musical tones are required for any embodiment of the invention. The store owner may choose a common and memorable set of identifying phrases, sounds, or musical tones such as the eight chime litany of a doorbell, the opening notes to Beethoven's fifth symphony, or any other recognizable tone sequence that has a sufficient number of discreet notes to convey to the listener the location of the customer within the department at the time of the request. In the alternative embodiment, the customer request may generate a verbal cue such as "position one," "position two" and so on that correlates uniquely to each position within the department to which a customer service representative has been assigned. To encourage employee mobility within the store, a store owner may program the invention to use the same tones or audio prompts to reflect comparable customer position within new positions to which a customer service representative is assigned. In such event, the identical nature of the identifying phrases, sounds, or musical tones will convey the same positional information within a new department to which a customer service representative has been reassigned and thereby enable that customer representative to more quickly identify and respond to customer requests.

Figure 5:
FIG. 5 illustrates an embodiment of a screen shot from the customer device of the invention.

FIG. 5 represents an embodiment of an enlarged version of the customer interface 500. In one embodiment of the invention, the customer interface device contains information, including photographs 505 and store based biographical data 510, to identify the customer representative assisting the customer. The customer initiates a request for assistance by depressing a button or touch screen 515. If the triage system established by the store owner calls for the customer request to "roll over" to another customer representative, then that person's photograph 505 and other identifying information 510 will appear on the screen. A rating system is preferably made available to the customer 515 to rate the service he or she has just received. No particular characterization of effort is required by the invention—any rating system may be adapted to the particular requirements of the store owner.

After a request for help is initiated, the system can either immediately refer the request to a customer representative or can further inquire about the request. For example, the system may prompt the customer to answer questions to determine the nature of the customer's request. The system may display a screen to determine, for example, if the customer is inquiring about the location of a product, the price of a product, a products features, or advice on which product to choose. The answers to the system's questions can then be used to more effectively direct the customer's request for help.

Figure 6:
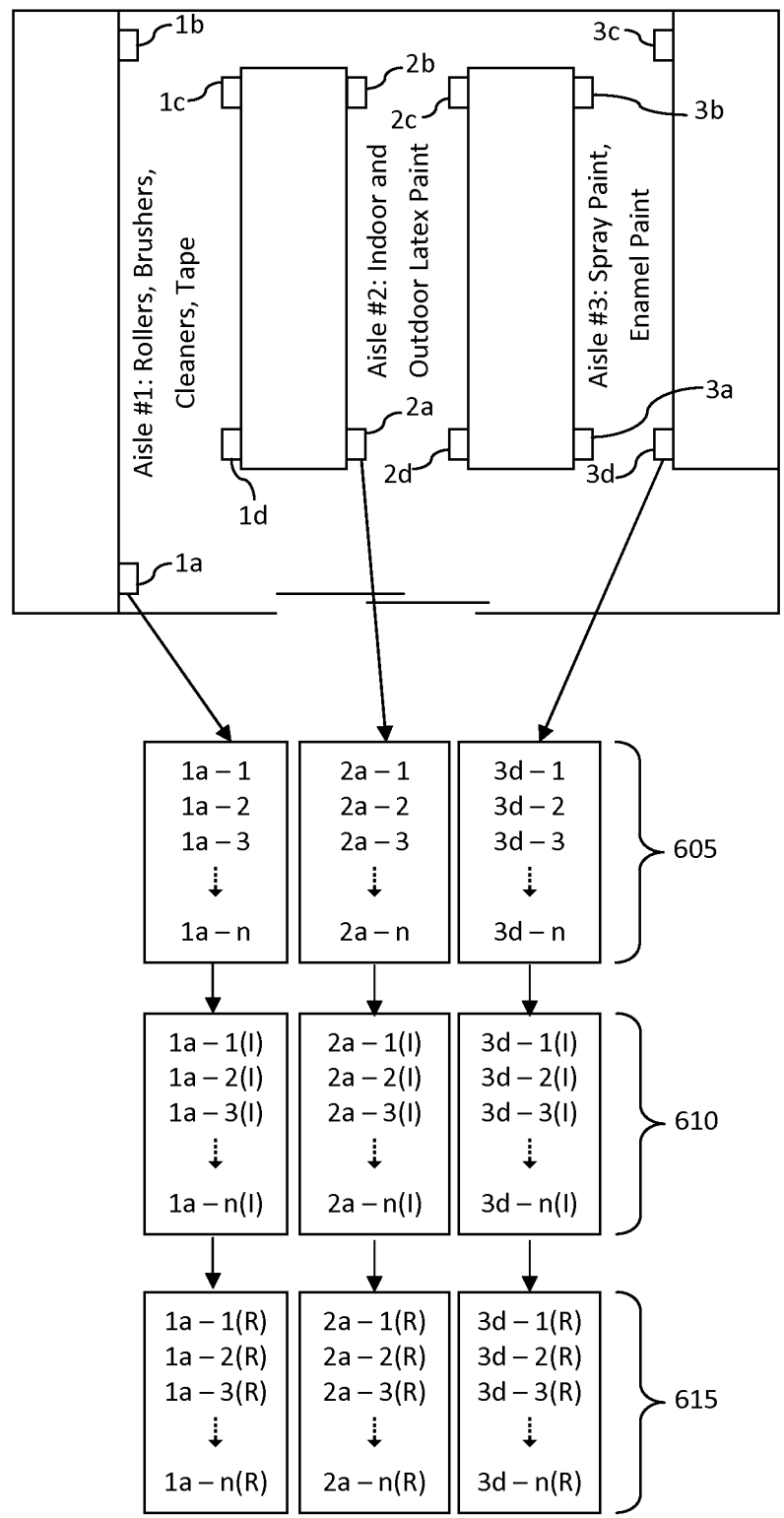
FIG. 6 illustrates an embodiment of the data collected by the invention.

FIG. 6 represents a data collection and processing method utilizing the invention. In the preferred embodiment, each customer initiated request for assistance from each position within a department is recorded 605 (1a-1 through 1a-n, 2a-1 through 2a-n, etc.). In one embodiment, the store owner records the time interval 610 between the initiation of a request for assistance and the customer representative's response (1a-1(I) through 1a-n(I), 2a-1(I) through 2a-n(I), etc.). The store owner may also record all "rollovers" of the customer request for assistance to secondary or tertiary customer representatives. The customer rating 615 is preferably also recorded for each location within the store (1a-1(R) through 1a-n(R), 2a-1(R) through 2a-n(R), etc.).

Data on interval of response, customer rollover, and customer rating (and such other data as the store owner elects to retrieve), is preferably recorded in a local or remote computer. Data from each customer service desk, kiosk, customer communication device, and/or placard is recorded and collated via a local area network and consistently recorded in a computing device of sufficient memory and processing capacity to perform the functions described herein.

The utility of such an apparatus and of such data are apparent and immediate. For example, the store owner may (1) compare the total number of customer requests for assistance to his allocation of personnel within a store and re-allocate personnel to ensure adequate coverage of customer requests; (2) develop either storewide or company-wide "norms" against which the performance of individual sales representatives can be judged; (3) test the timeliness and utility of customer representative's responses before and after training or retraining efforts; (4) compare a customer service representative's satisfaction responses at each station to determine whether the customer service representative needs assistance or re-training on a particular portion of the goods or services within his assigned department; (5) may develop policies on either a storewide or company-wide basis for the frequency of roll-over events for customer service representatives; (6) compare "before" and "after" readings of customer inquiries within a particular store location so as to be able to test customer response to in-store promotional displays; (7) reassign more effective employees to higher margin goods or services to increase profitability of operations; or (8) reposition goods, add in-store static references, or take other steps to reduce confusion.

In an additional embodiment of the invention, such data may be culled to avoid spurious customer reactions by, for example, excluding all customer ratings made without a pre-existing request for assistance or all customer ratings occurring more than a set period (e.g. 30 seconds) after conclusion of the communication with a customer representative.

Figure 7:
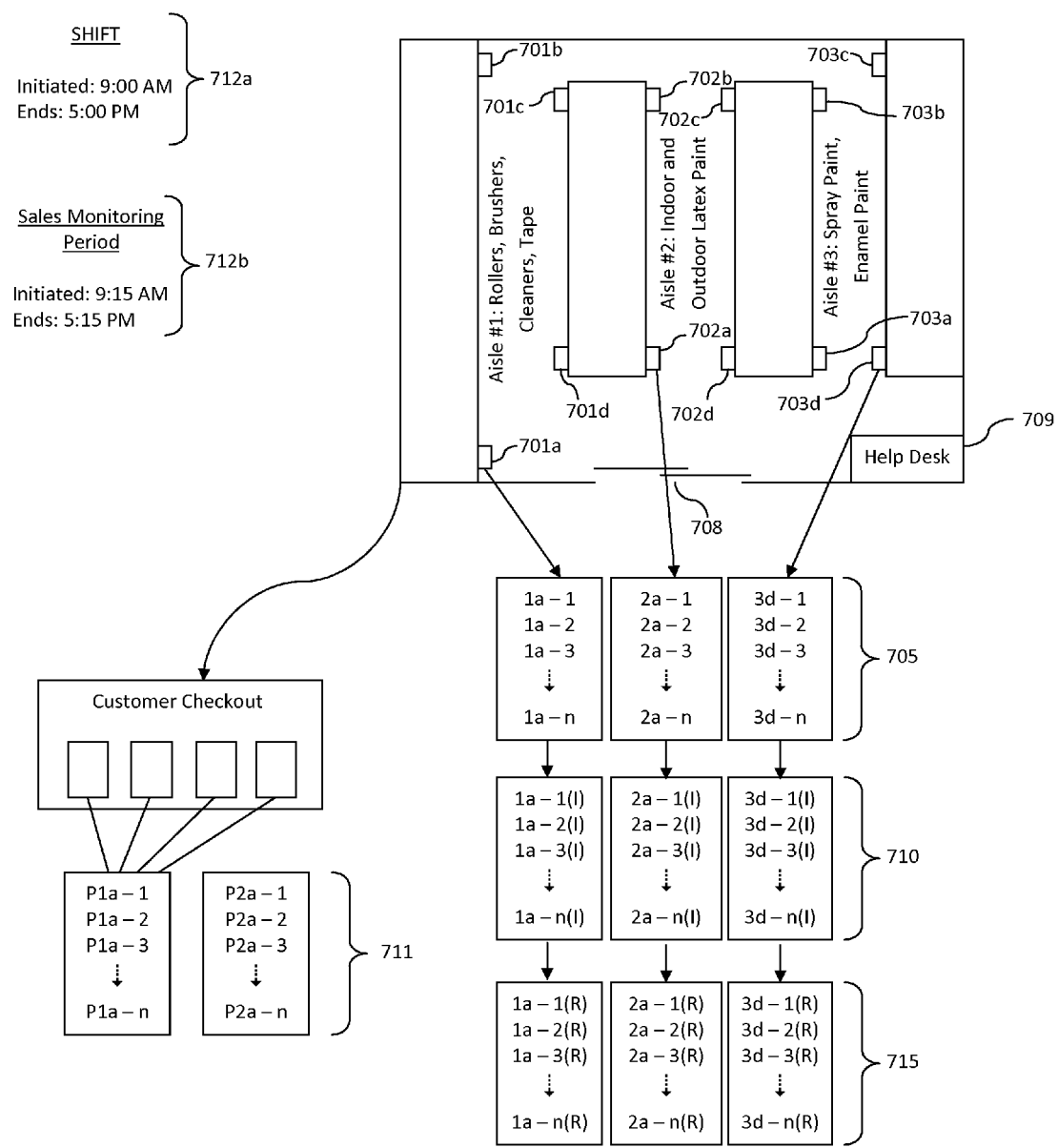
FIG. 7 illustrates an embodiment of additional data collected by the invention.

FIG. 7 represents an additional embodiment of the invention. In the embodiment of FIG. 7, data relating to frequency of requests for help, response time, employee availability, and satisfactoriness of response (705, 710 and 715), are correlated to sales made within a "shift" in the department to which a specific salesperson is logged into the system 711, enabling the employer/owner to statistically correlate and assess the effectiveness of specific employees in the sales process. In this embodiment, the customer service representative logs in at the beginning of a shift. Customers initiate help requests within the shift in which the customer service representative is working and (s)he responds and is graded. If the customer checks out by making a purchase, the check-out clerk scans all items in the customer's basket. Store owners then utilize an SKU, UPC, or other unique tag identifying the item of inventory sold or service provided and to be purchased and such component contains at least one identifying item permitting correlation to the customer representative having primary or secondary responsibility over that product or service line. Such data may be collected and collated for each sales representative.

In one embodiment of this system, data attributable to a customer service representative is sampled only after a fitting matriculation period for the customer is established (for example shift 712a or sales monitoring period 712b), so that the customer service representative is not unfairly advanced or injured by the preceding customer service representative's work.

In another embodiment of the invention, a customer borne customer interface system, PDA, or mobile hand-held device is equipped with a radio frequency identification device or a SKU/UPC scanning device, so that as products are placed into the cart, the system identifies such product. The resulting data is then recorded on a store wide and company-wide basis so that store owners may thereby immediately correlate data concerning customer inquiries, rollover, and customer reaction to specific product purchases. A store owner may, thereby more discretely analyze success or failure in specific sales transactions or promotions on an individual, store wide or company wide basis.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising" includes the terms "consisting of" and "consisting essentially of," and the terms comprising, including, and containing are not intended to be limiting.

The invention claimed is:

1. An in-store communication and data collection system, comprising:
   at least one portable customer interface unit;
   a plurality of location receptors positioned throughout the store, each location receptor adapted to announce the location of each portable customer interface unit within the store;
   a central processing unit in communication with the at least one customer interface unit and the plurality of location receptors;
   a plurality of customer representative units in communication with the central processing unit;
   software executing on the central processing unit wherein the software:
   receives a request for assistance from the at least one portable customer interface unit;
   determines the location of the request for assistance based on data received from the plurality of location receptors;
   determines, based on the location of the request for assistance, a first in-store designated customer representative;
   routes the request for assistance to the customer representative unit of the first in-store designated customer representative;
   reroutes the request for assistance to the customer representative unit of an additional in-store designated customer representative if the first in-store designated customer representative is unavailable;
   facilitates communication between the customer representative unit of an available customer representative and the at least one portable customer interface unit;
   is adapted to obtain and record obtains and records customer feedback from each portable customer interface unit; and
   displays identifying information of each designated customer representative on the at least one portable customer interface unit.

2. The communication system of claim 1, wherein the customer feedback is collected for each designated customer representative, analyzed, and output as at least one report.

3. The communication system of claim 2, wherein the customer feedback is collected one of on a periodic basis and continuously.

4. The communication system of claim 3, wherein the customer feedback is collected for all employees utilizing the system and compared by statistical analysis.

5. The communication system of claim 2, wherein the customer feedback is correlated with in-store sales data.

6. The communication system of claim 5, wherein the software determines the in-store sales that are attributable to each designated customer representative.

7. The communication system of claim 5, wherein the in-store sales data is systematically adjusted for the period in which sales occurring after the designated customer representative's shift are attributable to that designated customer representative.

8. The communication system of claim 1, wherein the software at least one of requires the recordation of a customer service request before recording a customer feedback, limits the interval between the customer service request and customer feedback to a predetermined interval, and ignores repeated customer feedback occurring within a defined interval of time following a single request for assistance from a given location.

9. The communication system of claim 1, wherein the software further produces discrete audible or visual signal at the customer representative unit identifying the location within the store of the request for assistance.

10. The communication system of claim 1, wherein the at least one portable customer interface unit is one of a personal mobile device, an on-cart device, and store-provided mobile device.

11. The communication system of claim 1, wherein the location receptor is one of an RFID transponder, ultrasonic identifier, radar device, bluetooth device, and GPS.

12. A method of in-store communication and data collection, comprising
positioning a plurality of location receptors throughout the store;
detecting a location of at least one portable customer interface unit based on each portable customer interface unit's proximity to at least one of the plurality of location receptors; and
coupling a central processing unit to each location receptor, each portable customer interface unit, and a plurality of customer representative units, wherein the central processing unit:
receives a request for assistance from at least one portable customer interface unit;
determines the location of the request for assistance from the at least one portable customer interface unit based on the detected location of the at least one portable customer interface unit;
determines, based on the location of the request for assistance, a first in-store designated customer representative;
routes the request for assistance to a customer representative unit of the first in-store designated customer representative;
reroutes the request for assistance to a customer representative unit of an additional in-store designated customer representative if the first designated customer representative is unavailable;
facilitates communication between the customer representative unit of an available customer representative and the at least one portable customer interface;
obtain and record customer feedback from each portable customer interface unit; and
display identifying information of a designated customer representative on the portable customer interface unit.

13. The method of claim 12, wherein the customer feedback is collected for each designated customer representative, analyzed, and output as at least one report.

14. The method of claim 13, wherein the customer feedback is collected one of on a periodic basis and continuously.

15. The method of claim 13, further comprising correlating the customer feedback to in-store sales data.

16. The method of claim 15, further comprising determining the in-store sales that are attributable to each designated customer representative.

17. The method of claim 16, wherein the customer feedback is collected for all employees and compared using statistical analysis.

18. The method of claim 16, wherein the in-store sales data is systematically adjusted for a period in which sales occurring after the designated customer representative's shift are attributable to that designated customer representative.

19. The method of claim 12, further comprising the central processing device at least one of requiring the recordation of a customer service request before recording a customer feedback, limiting the interval between the customer service request and customer feedback to a predetermined interval, and ignoring repeated customer feedback occurring within a defined interval of time following a single request for assistance from a given location.

20. The method of claim 12, further comprising producing discrete audible or visual signals at the customer representative unit identifying the location within the store of the request for assistance.

21. The method of claim 12, wherein the at least one portable customer interface unit is one of a personal mobile device, an on-cart device, and store-provided mobile device.

22. The method of claim 12, wherein the location receptor is one of an RFTD transponder, ultrasonic identifier, radar device, bluetooth device, and GPS.

* * * * *